United States Patent [19]

Levin

[11] 4,279,404
[45] Jul. 21, 1981

[54] GUIDE ARRANGEMENT FOR EXPANDING GATE VALVES

[75] Inventor: Alan Levin, Houston, Tex.

[73] Assignee: ACF Industries, Incorporated, New York, N.Y.

[21] Appl. No.: 85,837

[22] Filed: Oct. 17, 1979

[51] Int. Cl.³ .............................................. F16K 25/00
[52] U.S. Cl. .................................. 251/167; 251/196; 251/199
[58] Field of Search ............... 251/167, 169, 196, 197, 251/199

[56] References Cited

U.S. PATENT DOCUMENTS

| 2,583,512 | 1/1952 | Laurent | 251/196 |
| 2,855,175 | 10/1958 | Dunbar | 251/196 |
| 2,977,086 | 3/1961 | Heinen | 251/167 |
| 4,188,014 | 2/1980 | Alvarez | 251/196 |

Primary Examiner—Harold W. Weakley
Attorney, Agent, or Firm—Eugene N. Riddle; Stephen T. Belsheim

[57] ABSTRACT

The gate assembly (24) of an expanding gate valve has projecting pins (74, 76, 78) which engage guide surfaces (54, 66) of guide rails (52, 64) in order to maintain the gate assembly in a collapsed condition between its open and closed positions. At the fully open and fully closed positions, the pins register with gaps (56, 58, 60, 68, 70) in the guide surfaces to permit expansion of the gate assembly against a pair of valve seats (20, 22).

7 Claims, 3 Drawing Figures

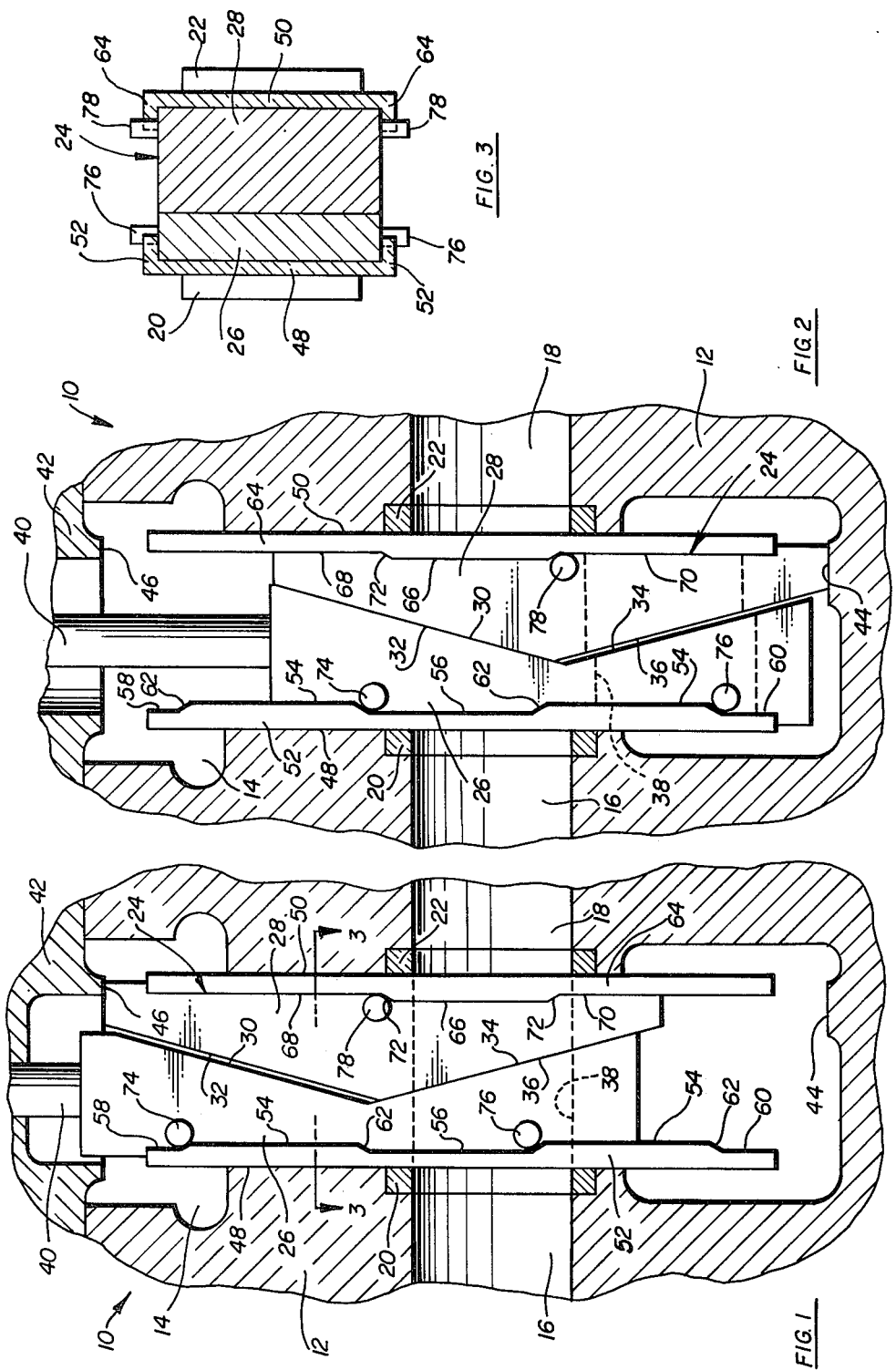

GUIDE ARRANGEMENT FOR EXPANDING GATE VALVES

BACKGROUND OF THE INVENTION

This invention relates generally to the field of expanding gate valves and deals more particularly with an improved guide arrangement for an expanding gate assembly.

Expanding gate valves typically include a gate member and a cooperating segment having interfacing wedge surfaces which act against one another to expand the gate mechanism by wedging action in both the fully open and fully closed positions of the valve. In order to prevent undue dragging or binding of the gate and segment against the valve seats, it is necessary to maintain the gate assembly in a collapsed condition as it moves between the open and closed positions. It is also necessary to assure that the gate assembly expands properly when it reaches the fully open or fully closed position.

In the past, curved springs have often been used to maintain the gate mechanism in its collapsed condition between the open and closed positions, as shown in U.S. Pat. No. 2,954,960 for example. When springs are used, their force must be overcome before the gate assembly can expand as intended, and the operating torque of the valve is increased accordingly. In addition, the forces exerted by the springs tend merely to move the gate and segment together. Consequently, when the gate assembly is initially moved away from the open or closed position, it is common for "back wedging" to occur whereby the gate moves beyond the intended centered position relative to the segment. The gate assembly is thus expanded prematurely due to wedging action between interfacing surfaces which are not intended to wedge against one another in the collapsed condition of the gate mechanism. Such back wedging is highly undesirable in that it greatly increases the operating torque of the valve and causes excessive wear on the valve components.

U.S. Pat. Nos. 2,583,512 and 2,855,175 disclose gate centralizers which avoid the forementioned problems associated with springs. However, the complicated mechanisms which are required in centralizers of this type add significantly to the cost and complexity of the valve. Another type of device for properly positioning an expanding gate assembly is disclosed in pending application Ser. No. 950,494, filed Oct. 11, 1978 by P. D. Alvarez.

SUMMARY OF THE INVENTION

The present invention has as its principle object the provision of an improved and simplified arrangement for maintaining an expanding gate assembly in a collapsed condition as it moves between the open and closed positions. In accordance with the invention, pins secured to the sides of the gate and segment are guided along guide rails which are formed on contoured edge portions of seat skirts mounted to the valve seats. Between the open and closed positions of the valve, engagement between the pins and rails prevents expansion of the gate assembly. However, when the gate assembly reaches the fully open position or the fully closed position, the pins register with gaps in the rails so that they can move outwardly into the gaps as the interfacing wedge surfaces of the gate and segment act against one another to expand the gate assembly against the vale seats.

BRIEF DESCRIPTION OF THE DRAWING

In the accompanying drawing:

FIG. 1 is a fragmentary sectional view of an expanding gate valve which is equipped with an improved guide arrangement constructed according to a preferred embodiment of the present invention, with the gate assembly shown in the fully open position;

FIG. 2 is a fragmentary sectional view similar to FIG. 1, but showing the gate assembly in the fully closed position; and FIG. 3 is a fragmentary sectional view taken generally along line 3—3 of FIG. 1 in the direction of the arrows.

DETAILED DESCRIPTION OF THE INVENTION

Referring now to the drawing in more detail, reference numeral 10 generally designates an expanding gate valve having a valve body 12 which presents therein the usual valve chamber 14. The flow passage of the valve is formed by an inlet passage 16 and on aligned outlet passage 18 between which valve chamber 14 is located in communication with the flow passage. Annular valve seats 20 and 22 are mounted in seat pockets formed about the respective flow passages 16 and 18 at locations adjacent opposite sides of valve chamber 14.

Mounted in valve chamber 14 is an expanding gate assembly which is generally designated by reference numeral 24. Gate assembly 24 includes a gate 26 and a segment 28 having interfacing surfaces which cooperate with one another in a manner to expand and collapse the gate assembly. The upper portion of gate 26 has an inclined surface 30 which interacts with a similarly inclined surface 32 formed on the upper portion of segment 28. When gate assembly 24 is in the fully closed position shown in FIG. 2, surfaces 30 and 32 engage one another in wedging fashion in order to expand the gate and segment against valve seats 20 and 22. A small gap is presented between surfaces 30 and 32 when the gate assembly is in the fully open position shown in FIG. 1. The lower portion of gate 26 has an inclined wedge surface 34 which interacts with a similarly inclined wedge surface 36 formed on the lower portion of segment 28. Surfaces 34 and 36 are inclined oppositely to the inclination of surfaces 30 and 32, with each wedge surface preferably being inclined at approximately 12° to 18° relative to the direction of movement of the gate assembly between the open and closed positions. In the fully open position of the gate assembly shown in FIG. 1, surfaces 34 and 36 act against one another in wedging fashion to expand the gate and segment against valve seats 20 and 22. As shown in FIG. 2, a small gap is presented between surfaces 34 and 36 in the fully closed position of gate assembly 24. Gate 26 and segment 28 have cooperating openings which form a flow port 38 through gate assembly 24. Port 38 is aligned with flow passages 16 and 18 in the open position of the valve and is out of alignment with the flow passages when the valve is closed.

An operating stem 40 is secured to the upper end of gate 26 and extends upwardly through a bonnet 42 which is bolted or otherwise secured to valve body 12. A handwheel or the like (not shown) is mounted on the top end of stem 40 in order to effect vertical opening and closing movement of gate assembly 24 in a well known manner. A lower stop 44 is formed on valve body 12 at the bottom end of chamber 14 in order to limit downward movement of segment 28. An upper stop 46 is formed on bonnet 42 at the top portion of valve chamber 14 in order to limit upward movement of the segment.

As best shown in FIG. 3, gate assembly 24 is guided between the open and closed portions by a pair of seat skirts 48 and 50 which are mounted to the respective upstream and downstream seats 20 and 22. Each skirt 48 and 50 has a round cutout therein which allows the skirt to be fitted on the valve seat. Seat skirt 48 has a flat surface which engages the flat outer surface of gate 26, while a flat surface of skirt 50 engages the flat outer surface of segment 28 in a manner to maintain the gate and segment in the proper positions during opening and closing movement of the gate assembly. In accordance with the present invention, a pair of guide rails 52 are formed by flanges which extend integrally from seat skirt 48 perpendicular thereto along opposite sides of gate 26. Referring again to FIGS. 1 and 2, the inner edge of each guide rail 52 is contoured to provide a straight surface 54 which is interrupted by a recessed gap 56 formed approximately in the center thereof. An additional pair of recesses or gaps 58 and 60 are formed in guide surface 54 at the top and bottom ends thereof. Inclined ramp surfaces 62 extend from guide surface 54 into each of the gaps to provide a gradual transition between the guide surface and gaps.

A pair of flange portions are similarly bent at right angles from the skirt 50 to provide a pair of guide rails 64 which extend along opposite sides of segment 28, as best shown in FIG. 3. The inside edge of each guide rail 64 has a configuration which presents a straight guide surface 66 near the center of the rail. An upper gap 68 is formed in each rail above guide surface 66, while a lower gap 70 is located below the guide surface of each rail 64. An inclined ramp surface 72 leads from guide surface 66 into each gap 68 and 70. Guide surfaces 54 and 66 extend parallel to the direction of movement of gate assembly 24 between the open and closed positions thereof.

A pair of vertically aligned pins 74 and 76 are secured to each side of gate 26 to project outwardly therefrom. Pin 74 is located near the top end of gate 26 at a location well above pin 76. Projecting outwardly from each side of segment 28 is a single pin 78 which is located near the central area of the segment. Pins 74, 76 and 78 are guided along rails 52 and 64 in a manner that will be described in more detail.

In use, stem 40 is axially reciprocated in order to move gate assembly 24 between the fully open position shown in FIG. 1 and the fully closed position shown in FIG. 2. When the gate assembly is in the open position shown in FIG. 1, segment 28 is in contact with stop 46 and surfaces 34 and 36 are wedged tightly against one another to expand gate 26 laterally against seat 20 and segment 28 laterally against seat 22. Pin 74 is located in gap 58 and pin 76 is located in gap 56 to permit expansion of the gate, while pin 78 is located in gap 68 in order to permit expansion of the segment. To effect closing of the valve, stem 40 is moved downwardly which initially causes pin 74 to travel out of gap 58 and onto guide surface 54 along ramp surface 62. Pin 76 simultaneously moves out of gap 56 and onto the adjacent guide surface. When gate 26 has moved downwardly far enough to move surface 30 into contact with surface 32, pins 74 and 76 are engaged against surface 54 such that additional downward movement of the gate carries segment 28 downwardly with it. Pin 78 is thus moved out of gap 68 and onto guide surface 66 as gate assembly 24 is moved to its collapsed condition wherein gate 26 and segment 28 are centered relative to one another, with surfaces 30 and 32 in contact and surfaces 34 and 36 in contact. In the collapsed condition, gate 26 is maintained inwardly of valve seat 20, while segment 28 is maintained inwardly of seat 22. As gate assembly 24 moves downwardly toward the closed position, the engagement of the pins with guide surfaces 54 and 66 prevents expansion of the gate assembly and thus prevents the gate from dragging or binding against the valve seats. Consequently, the operating torque of the valve is minimized.

When segment 28 has been moved downwardly far enough to engage stop 44, pin 78 moves off of guide surface 66 and into gap 70. Continued downward movement of gate 26 causes surfaces 30 and 32 to wedge against one another in order to expand the gate assembly. As the gate assembly expands, pins 74 and 76 enter gaps 56 and 60 such that the gate assembly is able to expand properly when it reaches the fully closed position shown in FIG. 2. Gate 26 is then pressed firmly against seat 20 and segment 28 is pressed firmly against seat 22 in order to prevent fluid leakage.

When stem 40 is moved upwardly to raise gate 26 from the fully closed position, pins 74 and 76 initially move out of gaps 56 and 60 onto guide surface 54. After surface 34 has contacted surface 36, continued upwardly movement of the gate carries segment 28 upwardly and moves pin 78 out of gap 70 and onto guide surface 66. Engagement of the pins with surfaces 54 and 66 thereafter holds the gate assembly in its collapsed condition as it moves from the closed position to the open position. When segment 28 contacts stop 46, pin 78 is located in gap 68 so that wedging action between surfaces 34 and 36 can expand the segment against seat 22 as upward movement of gate 26 continues. When the fully open position of the valve is reached, pins 74 and 76 register with gaps 58 and 56 to permit expansion of gate 26 against valve seat 20.

It is thus apparent that the improved guide arrangement of the present invention maintains gate assembly 24 in the collapsed condition as it moved between the open and closed positions. Consequently, excessive dragging of the gate components against the valve seats is avoided and the operating torque of the valve is minimized. The gaps in the guide surfaces are strategically located such that gate assembly 24 is able to properly expand when it reaches either the fully open position or the fully closed position. It should be pointed out that the inclined ramp surfaces 62 and 72 facilitate movement of the pins into and out of the gaps due to the smooth transitions provided by the gradually sloping inclined surfaces. Also, "back wedging" is avoided since the guide surfaces prevent gate 26 from moving beyond a centered position relative to segment 28 when the gate assembly is initially moved away from the fully open or fully closed position.

What is claimed is:

1. An expanding gate valve comprising:
 a valve body presenting a valve chamber therein and a fluid flow passage communicating with said valve chamber;
 a pair of spaced apart valve seats mounted in said valve body about the flow passage adjacent the valve chamber;

an expanding gate assembly mounted in said valve chamber for movement between open and closed positions relative to the flow passage, said gate assembly including a gate member and a segment member having cooperating wedge surfaces which interact with one another in wedging fashion to expand the gate assembly to an expanded condition wherein the gate and segment members are pressed against the valve seats in both the open and closed positions of the gate assembly, said wedge surfaces permitting said gate assembly to contract inwardly of the valve seats to a collapsed condition for movement between the open and closed positions;

a pair of spaced apart rails mounted in the valve body on opposite sides of the gate assembly, each rail having a guide surface thereon extending substantially parallel to the direction of movement of the gate assembly between the open and closed positions, each of said guide surfaces presenting a plurality of spaced apart gaps therein;

a pair of pin elements projecting from one of said gate and segment members at locations to travel along one of said guide surfaces during movement of the gate assembly between the open and closed positions, said pin elements registering with the gaps in said one guide surface in both the open and closed positions of the gate assembly;

a third pin element projecting from the other of said gate and segment members at a location to travel along the other guide surface during movement of the gate assembly between the open and closed positions, said third pin element registering with the gaps in said other guide surface in both the open and closed positions of the gate assembly;

said guide surfaces engaging said pins in a manner to prevent expansion of the gate assembly from the collapsed condition during movement of the gate assembly between the open and closed positions; and said pins entering said gaps to permit expansion of the gate assembly to the expanded condition in both the open and closed positions.

2. A gate valve as set forth in claim 1, wherein each rail has an inclined surface extending from each gap to the corresponding guide surface to facilitate movement of the pin elements into and out of the gaps.

3. A gate valve as set forth in claim 1, including a seat skirt mounted to each valve seat, said rails being provided on flange portions of the seat skirts which extend along side portions of the gate and segment members.

4. In an expanding gate valve of the type having a valve body, a valve chamber and communicating flow passage in the valve body, a pair of spaced apart valve seats mounted about the flow passage, an expanding gate assembly which includes a gate member and cooperating segment member mounted in the valve chamber for movement in a collapsed condition between open and closed positions of the gate assembly, means for expanding said gate and segment members against the valve seats in an expanded condition of the gate assembly when same is in both the open and closed positions, and a pair of seat skirts mounted to the respective valve seats for guiding the gate assembly, the combination of:

a first pair of guide rails extending from one of said seat skirts along opposite side portions of the gate member, each guide rail having an edge portion which presents a guide surface extending substantially parallel to the direction of motion of the gate assembly between the open and closed positions thereof, each edge portion having a configuration to provide three spaced apart gaps in each guide surface;

a second pair of guide rails extending from the other seat skirt along opposite side portions of the segment member, each guide rail in the second pair having an edge portion which presents a guide surface extending substantially parallel to the direction of motion of the gate assembly between the open and closed positions thereof, each edge portion of each guide rail in the second pair having a configuration to provide a pair of spaced apart gaps in each guide surface of the second pair of guide rails; and a pair of spaced apart pins projecting from each side portion of the gate member and a third pin projecting from each side portion of the segment member, said pins being arranged to travel along the guide surface in a manner to maintain the gate assembly in the collapsed condition between the open and closed positions, said pins entering the gaps in the open and closed positions of the gate assembly to permit said expanding means to expand the gate and segment members against the valve seats in both the open and closed positions of the gate assembly.

5. The combination set forth in claim 4, wherein each edge portion has a configuration to present an inclined surface extending into each gap from the corresponding guide surface, thereby facilitating movement of the pins into and out of the gaps.

6. In an expanding gate valve having a valve body which presents a valve chamber and a flow passage, an expanding gate assembly including a gate member and a segment member is mounted in said valve chamber for movement in a collapsed condition between open and closed positions of the gate assembly, and means for expanding the gate assembly to an expanded condition in both the open and closed positions, the improvement comprising:

a pair of spaced apart guide rails mounted in the valve body on opposite sides of the gate assembly, one rail being adjacent the gate member and the other rail being adjacent the segment member, each rail having a guide surface extending substantially parallel to the direction of movement of the gate assembly between the open and closed positions thereof;

one pin element extending from the gate member and another pin element extending from the segment member, said pin elements travelling along said guide surfaces of their corresponding rails in a manner to prevent expansion of the gate assembly when same is between the open and closed positions, thereby maintaining the gate assembly in the collapsed condition between the open and closed positions; and a pair of gaps in the guide surface of each rail, said pin elements registering with the gaps for entry therein in both the open and closed positions of the gate assembly to permit expansion of said gate assembly to the expanded condition thereof when the gate assembly is in the open position and when the gate assembly is in the closed position.

7. The improvement set forth in claim 6, including an inclined surface leading into each gap from the corresponding guide surface, thereby facilitating movement of the pins into and out of the gaps.

* * * * *